United States Patent
Feng et al.

(10) Patent No.: US 11,984,831 B2
(45) Date of Patent: May 14, 2024

(54) MOTOR CONTROL UNIT AND POWER SYSTEM

(71) Applicant: Huawei Technologies Co., Ltd., Shenzhen (CN)

(72) Inventors: Ningbo Feng, Xi'an (CN); Chunyang Liu, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 211 days.

(21) Appl. No.: 17/752,512

(22) Filed: May 24, 2022

(65) Prior Publication Data

US 2022/0286078 A1    Sep. 8, 2022

Related U.S. Application Data

(63) Continuation of application No. PCT/CN2020/089569, filed on May 11, 2020.

(30) Foreign Application Priority Data

Nov. 25, 2019 (CN) .......................... 201911167478.2

(51) Int. Cl.
H02P 29/028 (2016.01)
H02P 25/22 (2006.01)
H02P 27/08 (2006.01)

(52) U.S. Cl.
CPC ............ *H02P 29/028* (2013.01); *H02P 25/22* (2013.01); *H02P 27/08* (2013.01)

(58) Field of Classification Search
CPC ........ H02P 29/028; H02P 25/22; H02P 27/08; H02P 27/06; B60L 2210/42; B60L 15/007; B60L 15/06
USPC .......................................... 318/496, 495, 494
See application file for complete search history.

(56) References Cited

U.S. PATENT DOCUMENTS

| 9,705,313 | B2 | 7/2017 | Yamada et al. |
| 10,199,979 | B2 * | 2/2019 | Mori ................. G01R 19/0092 |
| 2011/0101906 | A1 | 5/2011 | Tagome |
| 2016/0204728 | A1 | 7/2016 | Notohara et al. |
| 2019/0103828 | A1 | 4/2019 | Suzuki et al. |

FOREIGN PATENT DOCUMENTS

| CN | 103683964 A | 3/2014 |
| CN | 205544896 U | 8/2016 |
| CN | 106068202 A | 11/2016 |
| CN | 104617803 B | 7/2018 |

(Continued)

*Primary Examiner* — David Luo
(74) *Attorney, Agent, or Firm* — Leydig, Voit & Mayer, Ltd.

(57) ABSTRACT

A device for controlling a motor is provided. A type of a power component in a first drive circuit of the device is different from a type of a power component in a second drive circuit of the device. A loss of the power component in the first drive circuit is greater than a loss of the power component in the second drive circuit. When determining that a load of the motor is less than a preset load, a controller of the device controls the first drive circuit to stop working and controls the second drive circuit to start to work. When determining that the load of the motor is greater than or equal to the preset load, the controller controls both the first drive circuit and the second drive circuit to start to work.

20 Claims, 7 Drawing Sheets

(56) References Cited

FOREIGN PATENT DOCUMENTS

| | | | |
|---|---|---|---|
| CN | 108370223 | A | 8/2018 |
| CN | 108649772 | A | 10/2018 |
| CN | 109861528 | A | 6/2019 |
| CN | 109889125 | A | 6/2019 |
| CN | 111030550 | A | 4/2020 |
| WO | 2019142877 | A1 | 7/2019 |

* cited by examiner

MOTOR CONTROL UNIT AND POWER SYSTEM

CROSS-REFERENCE TO RELATED APPLICATIONS

This application is a continuation of International Application No. PCT/CN2020/089569, filed on May 11, 2020, which claims priority to Chinese Patent Application No. 201911167478.2, filed on Nov. 25, 2019. The disclosures of the aforementioned applications are hereby incorporated by reference in their entireties.

TECHNICAL FIELD

This application relates to the field of power electronics technologies, and in particular, to a motor control unit and a power system.

BACKGROUND

With the shortage of energy and aggravation of environmental pollution in modern society, electric vehicles have attracted extensive attention. The electric vehicle uses an in-vehicle power battery pack as an energy source to drive a motor, and the motor drives wheels to rotate, so as to drive the vehicle to run.

A motor control unit (MCU) in the electric vehicle generally uses an insulated gate bipolar transistor (IGBT) three-phase half-bridge drive circuit to drive the motor. Because the motor is an alternating current motor, a function of the motor control unit is to invert a direct current output by the power battery pack into an alternating current, and supply the alternating current to the motor.

However, the IGBT component used in the motor control unit has a relatively large loss. Therefore, the motor control unit has a relatively large energy loss when the vehicle is running. As power of the power battery pack of the electric vehicle is limited, excessive energy consumption of the IGBT component reduces efficiency of the motor control unit, and affects endurance of the electric vehicle.

SUMMARY

To resolve the foregoing technical problem, this application provides a motor control unit and a power system, to improve efficiency of the motor control unit.

According to a first aspect, this application provides a motor control unit. The motor control unit includes a control unit and at least two drive circuits: a first drive circuit and a second drive circuit. A type of a power component in the first drive circuit is different from a type of a power component in the second drive circuit, a loss of the power component in the first drive circuit is greater than a loss of the power component in the second drive circuit, and a current withstand capability of the power component in the first drive circuit is greater than a current withstand capability of the power component in the second drive circuit. The first drive circuit inverts a direct current output by a corresponding direct current power supply into an alternating current and supplies the alternating current to a first part of windings of a motor. The second drive circuit is configured to invert a direct current output by a corresponding direct current power supply into an alternating current, and supply the alternating current to a second part of windings of the motor. The current withstand capability indicates a capability of the power component to withstand a maximum current when working normally. That is, a greater current withstand capability of the power component indicates a larger maximum current that the power component can withstand when working normally.

When determining that a load of the motor is less than a preset load (that is, light load), the control unit controls the first drive circuit to stop working and controls the second drive circuit to work. The second drive circuit has a lower loss, and therefore, when the second drive circuit is applied to the lightly loaded motor, a loss generated by the motor control unit can be reduced, thereby improving efficiency of the motor control unit. When determining that the load of the motor is greater than or equal to the preset load (that is, heavy load), the control unit controls both the first drive circuit and the second drive circuit to work, to increase a current supplied to the motor, and ensure that the motor can work normally when the motor is heavily loaded.

Therefore, the motor control unit can utilize the higher current withstand capability of the first drive circuit and the lower loss of the second drive circuit, that is, respective advantages of the first drive circuit and the second drive circuit are combined, so that working efficiency can be improved while working safety can be ensured in a large current situation. When applied to the electric vehicle field, the motor may be a motor on an electric vehicle. In this case, a scenario in which the motor is lightly loaded may correspond to situations in which an accelerator pedal is lightly depressed, a vehicle speed is relatively low, and the like, while a scenario in which the motor is heavily loaded may correspond to situations in which the accelerator pedal is heavily depressed, the vehicle speed is relatively high, and the like. Due to a limited capacity of a power battery pack of the electric vehicle, endurance of the electric vehicle can also be improved as the working efficiency of the motor control unit is improved.

With reference to the first aspect, in a first possible implementation, the power component of the first drive circuit is an insulated gate bipolar transistor IGBT, and the power component of the second drive circuit is a wide-band-gap semiconductor component.

The IGBT component has a higher current withstand capability, through which a larger current can flow, so that a less quantity of IGBT components need to be used, thereby reducing costs. The wide-band-gap semiconductor component has a lower loss, and therefore, when applied to a scenario in which the motor is lightly loaded, can improve efficiency of the motor control unit. A plurality of wide-band-gap semiconductor components may be connected in parallel during use, so that each wide-band-gap semiconductor component shunts an entire current.

With reference to the first aspect and any implementation above, in a second possible implementation, the wide-band-gap semiconductor component may be either of a silicon carbide metal-oxide-semiconductor field-effect transistor (SiC-MOSFET) and a gallium nitride (GaN) transistor.

With reference to the first aspect and any implementation above, in a third possible implementation, the motor includes six phases of windings, the first drive circuit is an IGBT three-phase half-bridge drive circuit, and the second drive circuit is a SiC-MOSFET three-phase half-bridge drive circuit. The IGBT three-phase half-bridge drive circuit is configured to drive three phases of windings in the motor, and the SiC-MOSFET three-phase half-bridge drive circuit is configured to drive the other three phases of windings in the motor.

When the motor is lightly loaded, because the SiC-MOSFET component has a lower loss, when the SiC- MOSFET three-phase half-bridge drive circuit works alone, a loss of the motor control unit can be reduced, thereby improving efficiency of the motor control unit. The IGBT component has a higher current withstand capability, through which a larger current can flow, so that only one IGBT component needs to be used in each half bridge arm. In addition, when the motor is heavily loaded, the entire second drive circuit does not need to withstand a large current, which can reduce a quantity of SiC-MOSFET components connected in parallel, thereby reducing component costs, and improving control reliability as the quantity of SiC-MOSFET components controlled by the control unit is reduced.

With reference to the first aspect and any implementation above, in a fourth possible implementation, the motor includes six phases of windings, the first drive circuit is an IGBT three-phase half-bridge drive circuit, and the second drive circuit is a GaN three-phase half-bridge drive circuit. The IGBT three-phase half-bridge drive circuit is configured to drive three phases of windings in the motor, and the GaN three-phase half-bridge drive circuit is configured to drive the other three phases of windings in the motor.

When the motor is lightly loaded, because the GaN component has a lower loss, when the GaN three-phase half-bridge drive circuit works alone, a loss of the motor control unit can be reduced, thereby improving efficiency of the motor control unit. The IGBT component has a higher current withstand capability, through which a larger current can flow, so that only one IGBT component needs to be used in each half bridge arm. In addition, when the motor is heavily loaded, the entire second drive circuit does not need to withstand a large current, which can reduce a quantity of GaN components connected in parallel, thereby reducing component costs, and improving control reliability as the quantity of GaN components controlled by the control unit is reduced.

With reference to the first aspect and any implementation above, in a fifth possible implementation, the control unit sends a first group of drive signals to the power component of the first drive circuit, and sends a second group of drive signals to the power component of the second drive circuit. An angle range of a phase difference between the first group of drive signals and the second group of drive signals is 0 to 180 degrees. That is, the control circuit sends carriers to the two drive circuits in an interleaved manner. The control unit sends carriers in an interleaved manner, so that a ripple current of a filter capacitor used in the motor control unit can be reduced, thereby reducing a capacity requirement on the filter capacitor, and reducing component costs, and a torque ripple of the motor is smoother.

With reference to the first aspect and any implementation above, in a sixth possible implementation, the phase difference between the first group of drive signals and the second group of drive signals is 90 degrees. In this case, an effect of reducing a ripple of a capacitor is optimal, that is, a ripple on a current supplied to a winding of the motor is minimal.

With reference to the first aspect and any implementation above, in a seventh possible implementation, the motor includes nine phases of windings, and there are two first drive circuits and one second drive circuit. The two first drive circuits are configured to drive six phases of windings in the motor, and the one second drive circuit drives remaining three phases of windings in the motor.

With reference to the first aspect and any implementation above, in an eighth possible implementation, the motor control unit further includes at least one third drive circuit. The type of the power component in the first drive circuit, the type of the power component in the second drive circuit, and a type of a power component in the third drive circuit are different from each other.

With reference to the first aspect and any implementation above, in a ninth possible implementation, the motor includes nine phases of windings, and there are one first drive circuit, one second drive circuit, and one third drive circuit. The first drive circuit, the second drive circuit, and the third drive circuit each are configured to drive three phases of different windings in the motor.

In the seventh to ninth possible implementations, a quantity of phases of the motor and a quantity of drive circuits are increased, so that the motor and the motor control unit not only have a fault tolerance capability, but also can adapt to different load situations. In addition, when the quantity of phases of the motor is determined, an optimal (or better) balance between motor efficiency, motor stability, and component costs can be achieved by adjusting a type of a power component used in each drive circuit.

With reference to the first aspect and any implementation above, in a tenth possible implementation, the motor control unit further includes a filter capacitor. Two ends of the filter capacitor are connected between an input end of the first drive circuit and an input end of the second drive circuit. The filter capacitor may be configured to filter out noise in a signal.

With reference to the first aspect and any implementation above, in an eleventh possible implementation, the motor control unit further includes a first filter capacitor and a second filter capacitor. Two ends of the first filter capacitor are connected to an input end of the first drive circuit. Two ends of the second filter capacitor are connected to an input end of the second drive circuit. The first filter capacitor and the second filter capacitor correspond to different direct current power supplies.

When the first drive circuit and the second drive circuit correspond to different direct current power supplies, the first filter capacitor and the second filter capacitor also correspond to different direct current power supplies, and currents flowing through the two drive circuits are different in a heavy load situation. Therefore, capacitance of a corresponding filter capacitor may be determined flexibly based on an output capability of a corresponding direct current power supply, so that a current ripple on the filter capacitor can be further reduced.

With reference to the first aspect and any implementation above, in a twelfth possible implementation, the motor control unit provided in any implementation above may be applied to an electric vehicle, the direct current power supply is a power battery pack of the electric vehicle, and a vehicle control unit of the electric vehicle sends the load of the motor to the control unit of the driver.

According to a second aspect, this application further provides a power system. The power system includes a motor and the motor control unit that is provided in any implementation above. The motor control unit is configured to drive windings of the motor. The motor is configured to supply power to a load. A quantity of windings of the motor is at least N times 3. N is an integer greater than or equal to 2.

Because the power system includes the motor control unit described above, when the motor is lightly loaded, a loss generated by the driver can be reduced, thereby improving efficiency of the driver. When the motor is heavily loaded, a higher current withstand capability of a first drive circuit and a lower loss of a second drive circuit can be utilized. Respective advantages of the first drive circuit and the second drive circuit are combined, so that working efficiency can be improved while safety can be ensured in a large current situation.

When the power system is applied to an electric vehicle, efficiency of the motor control unit can be improved, thereby improving endurance of an in-vehicle battery (power battery pack) of the electric vehicle. In addition, because the power system includes at least two drive circuits, when one of the drive circuits is faulty, another drive circuit can continue to work normally, thereby enhancing a fault tolerance capability of the power system.

With reference to the second aspect, in a first possible implementation, the windings of the motor may be any of the following: six phases of windings, nine phases of windings, twelve phases of windings, or fifteen phases of windings.

A quantity of phases of the motor and a quantity of drive circuits are increased, so that the motor and the motor control unit not only have a fault tolerance capability, but also can adapt to different load situations.

This application has at least the following advantages:
The motor control unit includes at least two drive circuits: a first drive circuit and a second drive circuit. A type of a power component in the first drive circuit is different from a type of a power component in the second drive circuit, a loss of the power component in the first drive circuit is greater than a loss of the power component in the second drive circuit, and a current withstand capability of the power component in the first drive circuit is greater than a current withstand capability of the power component in the second drive circuit. When determining that a load of a motor is less than a preset load (that is, light load), the control unit of the motor control unit controls the first drive circuit to stop working and controls the second drive circuit to work. Because a conduction loss of the second drive circuit is lower, in a light load situation, only the second drive circuit is allowed to work, which can reduce a loss generated by the driver, thereby improving energy conversion efficiency of the motor control unit. When determining that the load of the motor is greater than or equal to the preset load (that is, heavy load), the control unit controls both the first drive circuit and the second drive circuit to work, so that the higher current withstand capability of the first drive circuit and the lower loss of the second drive circuit can be utilized. That is, respective advantages of the first drive circuit and the second drive circuit are combined, so that working efficiency can be improved while working safety can be ensured in a large current situation.

In conclusion, when the motor control unit provided in the embodiments of this application is applied to an electric vehicle field, that is, the motor is a motor on an electric vehicle, working efficiency of the motor control unit can be improved, thereby improving endurance of the electric vehicle.

DETAILED DESCRIPTION

To make persons skilled in the art better understand technical solutions provided in embodiments of this application, a motor control unit provided in embodiments of this application may be applied to various technical fields of motor driving. To help persons skilled in the art better understand the technical solutions provided in this application, the following uses a motor in an electric vehicle as an example for description. A specific application scenario of the motor control unit is not limited in embodiments of this application.

In the electric vehicle, a function of the motor control unit is to convert electric energy supplied by a power battery pack into mechanical energy and supply the mechanical energy to wheels of the electric vehicle. Therefore, conversion efficiency of the motor control unit affects efficiency of the power battery pack, and affects endurance of the electric vehicle.

First, a working principle of using an IGBT three-phase half-bridge drive circuit for the motor of the electric vehicle is described.

Figure 1:
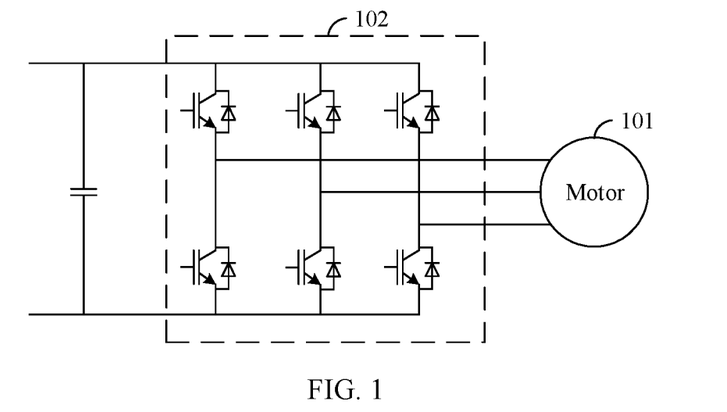
FIG. 1 is a schematic diagram of using an IGBT three-phase half-bridge drive circuit.

FIG. 1 is a schematic diagram of using an IGBT three-phase half-bridge drive circuit for a motor.

A motor 101 is a three-phase motor, a motor control unit includes an IGBT three-phase half-bridge drive circuit 102, and a filter capacitor is connected in parallel to two ends of the IGBT three-phase half-bridge drive circuit 102.

The IGBT component has a relatively large loss. This leads to a relatively large energy loss of the motor control unit, and reduces conversion efficiency of a power battery pack in an electric vehicle, especially, when the motor is lightly loaded. For example, when the motor is lightly loaded, correspondingly, an accelerator pedal of the electric vehicle is lightly depressed, and a vehicle speed is relatively low. In this case, output power of the motor is also relatively low, and a switching loss of the IGBT component accounts for a relatively large proportion of a total loss.

To resolve the foregoing technical problem, this application provides a motor control unit having different power components and a power system. The motor control unit includes at least two drive circuits including a first drive circuit and a second drive circuit, to improve efficiency of the motor control unit, thereby improving endurance of a power battery pack of an electric vehicle.

To make a person skilled in the art better understand the solutions in this application, the following clearly describes the technical solutions in embodiments of this application with reference to accompanying drawings in embodiments of this application. It may be understood that terms such as "first" and "second" in the following embodiments are merely for ease of explanation and description, and do not constitute a limitation on this application.

Embodiment 1 of the Motor Control Unit This embodiment of this application provides a motor control unit. The following still uses an example in which the motor control unit is applied to an electric vehicle scenario for an exemplary description.

Figure 2:
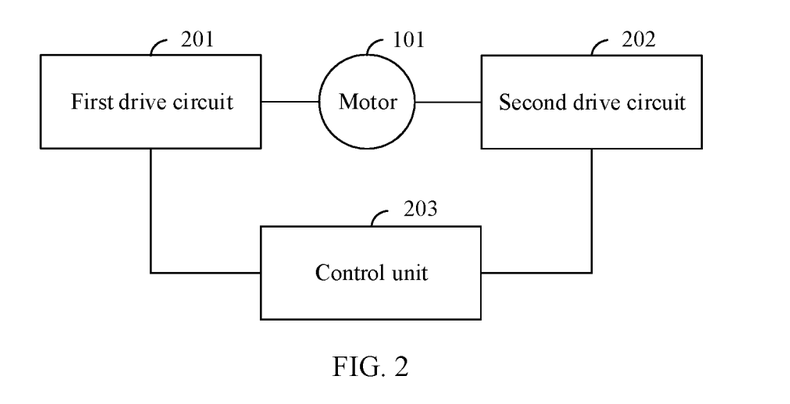
FIG. 2 is a schematic diagram of a motor control unit according to an embodiment of this application.

FIG. 2 is a schematic diagram of a motor control unit according to an embodiment of this application.

The motor control unit includes a control unit 203 and at least two drive circuits: a first drive circuit 201 and a second drive circuit 202.

The first drive circuit 201 inverts a direct current output by a corresponding direct current power supply into an alternating current, and supplies the alternating current to a first part of windings of a motor 101.

The second drive circuit 202 inverts a direct current output by a corresponding direct current power supply into an alternating current, and supplies the alternating current to a second part of windings of the motor 101.

It should be noted that the first drive circuit 201 and the second drive circuit 202 may correspond to a same direct current power supply, or may correspond to different direct current power supplies. For example, the first drive circuit 201 corresponds to a direct current power supply A, and the second drive circuit 202 corresponds to a direct current power supply B.

In an actual application, when an application scenario is an electric vehicle scenario, the direct current power supply may be a power battery pack of the electric vehicle. When the first drive circuit 201 and the second drive circuit 202 correspond to a same direct current power supply, the electric vehicle includes one power battery pack. When the first drive circuit 201 and the second drive circuit 202 correspond to two different direct current power supplies, the electric vehicle may include two power battery packs.

A type of a power component in the first drive circuit 201 of the motor control unit is different from a type of a power component in the second drive circuit. A loss of the power component in the first drive circuit 201 is greater than a loss of the power component in the second drive circuit 202. A current withstand capability of the power component in the first drive circuit 201 is greater than a current withstand capability of the power component in the second drive circuit 202. The current withstand capability indicates a capability of the power component to allow a maximum current to flow.

When determining that a load of the motor 101 is less than a preset load, that is, determining that the motor is in a lightly loaded state, the control unit 203 controls the first drive circuit 201 to stop working and controls the second drive circuit 202 to work. The second drive circuit 202 has a lower current withstand capability but correspondingly has a lower loss, and when the second drive circuit 202 is applied to the lightly loaded motor, a loss generated by the motor control unit can be reduced, thereby improving efficiency of the motor control unit. The scenario in which the motor is lightly loaded may correspond to situations in which an accelerator pedal of the electric vehicle is lightly depressed, a vehicle speed is relatively low, and the like in actual applications.

When determining that the load of the motor 101 is greater than or equal to the preset load, the control unit 203 controls both the first drive circuit 201 and the second drive circuit 202 to work. Advantages of the first drive circuit having a higher current withstand capability and the second drive circuit having a lower loss are utilized. Therefore, respective advantages of the first drive circuit and the second drive circuit are combined, so that working efficiency can be improved while safety can be ensured in a large current situation. The scenario in which the motor is heavily loaded may correspond to situations in which the accelerator pedal of the electric vehicle is heavily depressed, the vehicle speed is relatively high, and the like in actual applications.

The preset load may be determined based on an actual situation. This is not specifically limited in this embodiment of this application. The control unit may obtain a current load status of the motor by using a vehicle control unit of the electric vehicle.

Because the motor control unit includes at least two drive circuits, and the motor 101 also includes at least two parts of windings correspondingly, in an actual application, when both the first drive circuit 201 and the second drive circuit 202 are three-phase half-bridge drive circuits, the windings of the motor 101 include at least six phases of windings. For example, the motor 101 includes at least two three-phase windings, the first drive circuit 201 drives three phases of windings, and the second drive circuit drives three phases of different windings.

In conclusion, according to the motor control unit provided in this application, working states of the drive circuits can be determined based on a load status of the motor, so that efficiency of the motor control unit can be improved. For example, when the motor is a motor in an electric vehicle, endurance of an in-vehicle battery (power battery pack) of the electric vehicle is improved.

Embodiment 2 of the Driver

Based on the description of the foregoing embodiment, the following describes, with reference to exemplary implementations of the drive circuits, a working principle of the motor control unit provided in this application.

This embodiment is described with reference to exemplary power component types.

For example, the power component of the first drive circuit is an insulated gate bipolar transistor (IGBT), and the power component of the second drive circuit is a wide-band-gap semiconductor component. The wide-band-gap semiconductor component may be, for example, a silicon carbide metal-oxide-semiconductor field-effect transistor (SiC-MOSFET) or a gallium nitride (GaN) transistor.

The following uses an example in which the power component of the first drive circuit is an IGBT and the power component of the second drive circuit is a SiC-MOSFET for description. When the motor control unit is applied to an electric vehicle, the first drive circuit may be an IGBT three-phase half-bridge drive circuit, and the second drive circuit may be a SiC-MOSFET three-phase half-bridge drive circuit. For example, the windings of the motor include six phases of windings, for example, include two three-phase windings. The IGBT three-phase half-bridge drive circuit is configured to drive three phases of windings in the motor, and the SiC-MOSFET three-phase half-bridge drive circuit is configured to drive the other three phases of windings in the motor.

Figure 3:
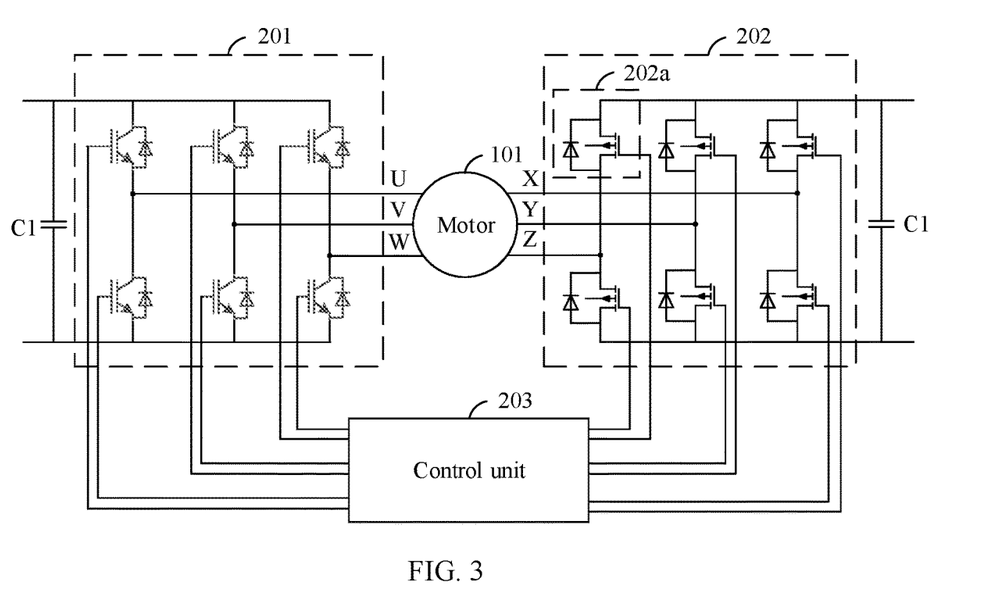
FIG. 3 is a schematic diagram of another motor control unit according to an embodiment of this application.

FIG. 3 is a schematic diagram of another motor control unit having different power components according to an embodiment of this application.

The first drive circuit 201 is, for example, an IGBT three-phase half-bridge drive circuit, and the first drive circuit 201 is connected to the first part of windings, that is, three phases of windings U, V, and W in the figure, of the motor 101.

When the IGBT component is used, because the IGBT component has a high current withstand capability, a quantity of used components can be reduced, that is, an upper half bridge arm and a lower half bridge arm of each bridge arm each include one IGBT component.

The second drive circuit 202 is, for example, a SiC-MOSFET three-phase half-bridge drive circuit, and the second drive circuit 202 is connected to the second part of windings, that is, three phases of windings X, Y, and Z in the figure, of the motor 101.

Because a current withstand capability of the SiC-MOSFET component is lower than the current withstand capability of the IGBT component, during working, to withstand a same current, a plurality of SiC-MOSFET components need to be connected in parallel to be equivalent to one power component as a whole, that is, each SiC-MOSFET component shunts the entire current. That is, a part 202a of the upper half bridge arm and the lower half bridge arm of each bridge arm actually includes a plurality of SiC-MOSFET components connected in parallel. The plurality of SiC-MOSFET components connected in parallel are merely shown in the figure as equivalent to one SiC-MOSFET component. The IGBT component has a higher current withstand capability, through which a larger current can flow, so that only one IGBT component needs to be used in each half bridge arm.

A quantity of SiC-MOSFET components connected in parallel may be determined based on an actual situation, for example, may be determined with reference to an exemplary value of the preset load. This is not specifically limited herein in this embodiment of this application.

The motor control unit further includes a filter capacitor C1.

Two ends of the filter capacitor C1 are connected between an input end of the first drive circuit 201 and an input end of the second drive circuit 202. The filter capacitor C1 may be configured to filter out noise in a signal.

In this embodiment of this application, the first drive circuit 201 and the second drive circuit 202 are not in a relationship of being simply combined for working, but need to be controlled by the control unit 203 to drive the motor 101. The following describes a working principle of the control unit 203.

Figure 4:
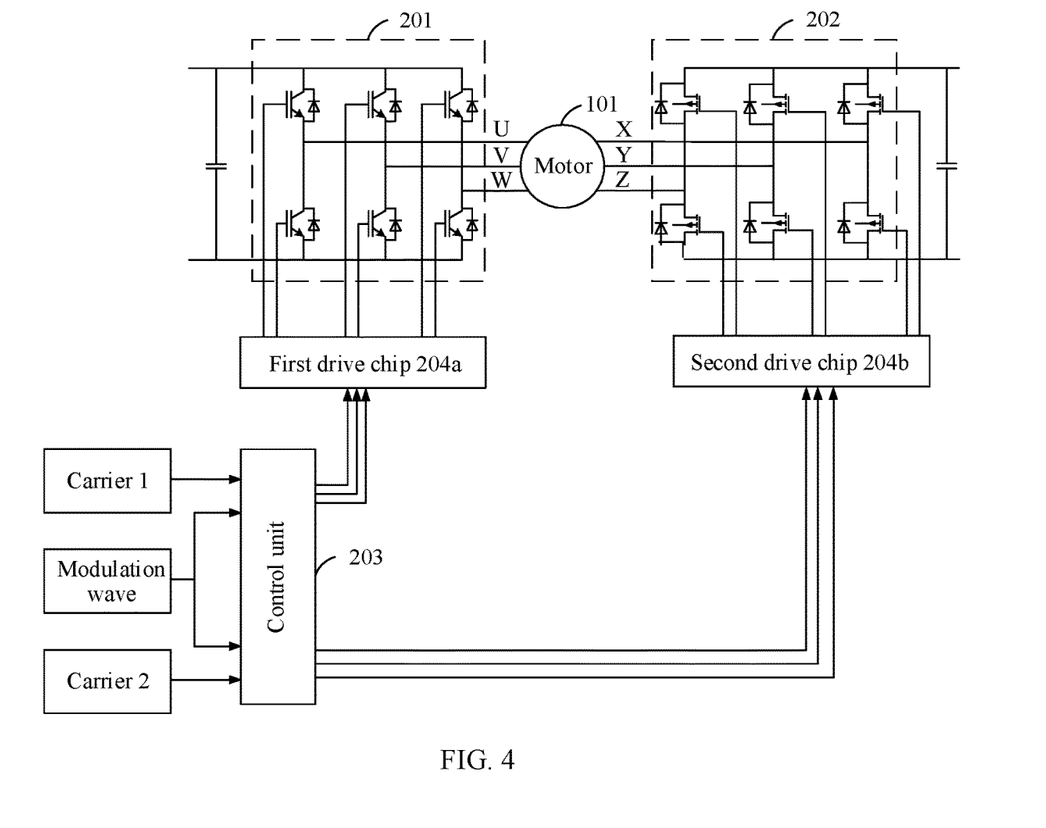
FIG. 4 is a schematic diagram of still another motor control unit according to an embodiment of this application.
Figure 5:
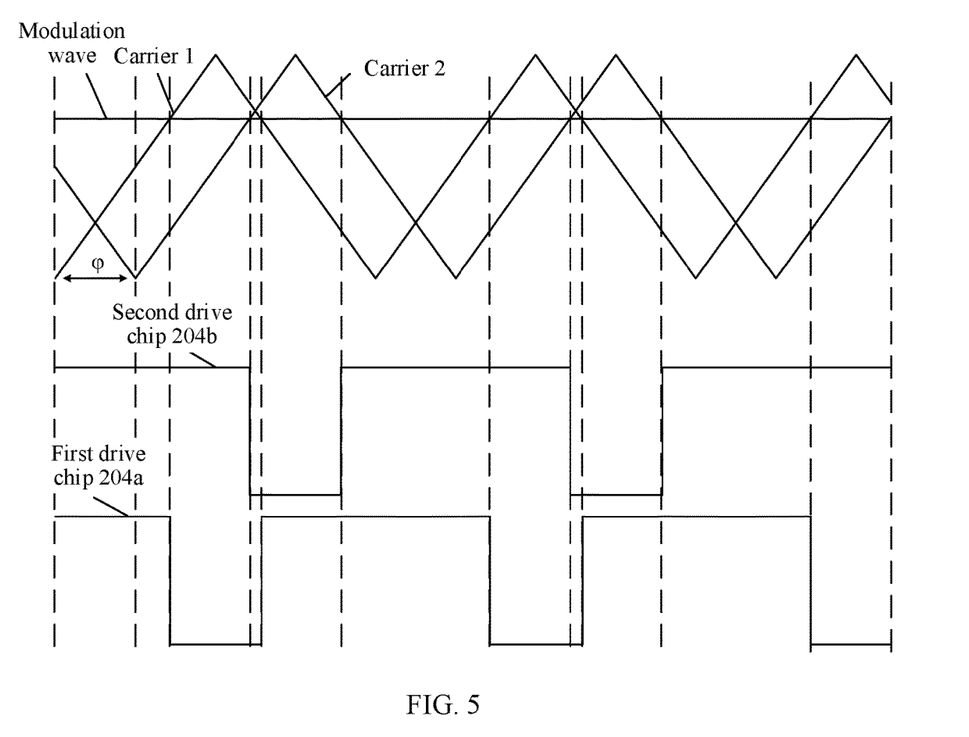
FIG. 5 is a waveform graph of a signal modulation process according to an embodiment of this application.

FIG. 4 is a schematic diagram of still another motor control unit having different power components according to an embodiment of this application. FIG. 5 is a waveform graph of a signal modulation process according to an embodiment of this application.

The control unit 203 sends a first group of drive signals to the power component of the first drive circuit 201, and sends a second group of drive signals to the power component of the second drive circuit 202.

After amplified by a first drive chip 204a, the first group of drive signals are used to control a working state of the power component of the first drive circuit 201. After amplified by a second drive chip 204b, the second group of drive signals are used to control a working state of the power component of the second drive circuit 202. The two drive chips have a signal amplification function, and the two drive chips may be disposed independently of each other, or may be integrated. This is not specifically limited in this embodiment of this application.

The control unit 203 may modulate carriers by using a modulation wave to generate the drive signals of the first drive circuit 201 and the second drive circuit 202. Specifically, referring to FIG. 4, both a carrier 1 and a carrier 2 are triangular waves, and a phase difference is (p. The control unit 203 modulates the carrier 1 and the carrier 2 into (pulse width modulation (PWM) signals by using the modulation wave. After the carrier 1 is modulated by using the modulation wave, the first group of drive signals corresponding to the first drive circuit 201 are generated. After the carrier 2 is modulated by using the modulation wave, the second group of drive signals corresponding to the second drive circuit 202 are generated.

Figure 6:
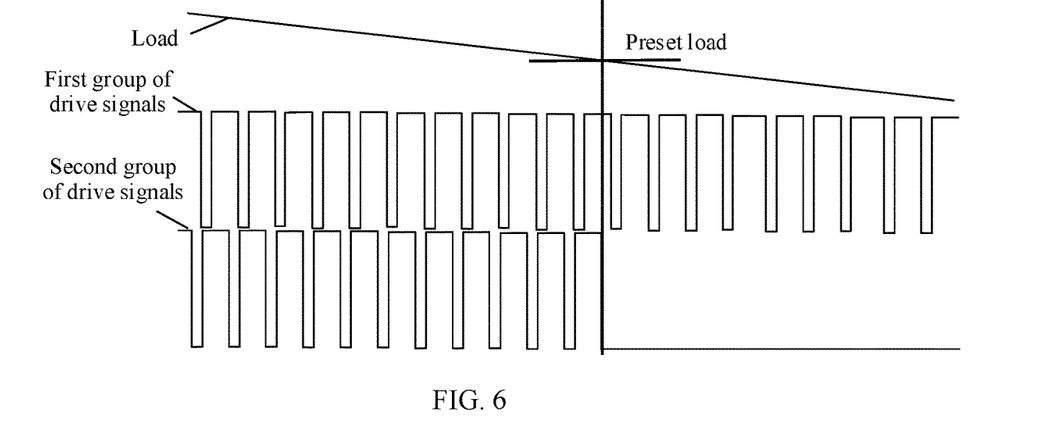
FIG. 6 is a schematic diagram of drive signals according to an embodiment of this application.

FIG. 6 is a schematic diagram of drive signals according to an embodiment of this application.

The vehicle control unit (VCU) of the electric vehicle may send a current load of the motor to the control unit 203 of the driver. When the current load of the motor is lower than the preset load, the second control unit 203b stops sending the second group of drive signals to the power component of the second drive circuit 202, so that the second drive circuit 202 stops working. In this case, only the SiC-MOSFET component works, which can reduce a loss generated by the motor control unit, thereby improving efficiency of the motor control unit.

When the load of the motor is higher than the preset load (that is, heavy load), the first control unit 203a and the second control unit 203b simultaneously send drive signals. An angle range of the phase difference φ between the carrier 1 and the carrier 2 is 0 to 180°. That is, the control circuit sends the carriers to the two drive circuits in an interleaved manner. Compared with the solution shown in FIG. 1, a ripple current of the filter capacitor C1 can be reduced, so that a capacity requirement on the filter capacitor C1 is reduced, component costs are reduced, and a torque ripple of the motor is smoother and has a lower Noise, Vibration, Harshness (NVH, an abbreviation of noise, vibration, harshness, which is a comprehensive indicator to measure manufacturing quality of vehicles).

An angle range of a phase difference between the first group of drive signals and the second group of drive signals is 0 to 180 degrees. The phase difference between the first group of drive signals and the second group of drive signals may be set based on an actual requirement. This is not specifically limited in this embodiment of this application. When the phase difference between the first group of drive signals and the second group of drive signals is 90 degrees, an effect of reducing a ripple of the capacitor is optimal, that is, a ripple on a current supplied to a winding of the motor is minimal.

When the motor is heavily loaded, the two power components work together, so that the higher current withstand capability of the first drive circuit and the lower loss of the second drive circuit can be utilized. Respective advantages of the first drive circuit and the second drive circuit are combined, so that working efficiency can be improved while safety can be ensured in a large current situation. In addition, the entire second drive circuit does not need to withstand a large current, which can reduce a quantity of SiC-MOSFET components connected in parallel, thereby reducing component costs, and improving control reliability as the quantity of SiC-MOSFET components controlled by the control unit is reduced.

In conclusion, according to the motor control unit provided in this application, working states of the drive circuits can be determined based on a load status of the motor, so that efficiency of the motor control unit can be improved, thereby improving endurance of an in-vehicle battery (power battery pack) of an electric vehicle. In addition, because the motor control unit includes at least two drive circuits, when one of the drive circuits is faulty, the control unit can control another drive circuit to continue to work normally, thereby enhancing a fault tolerance capability of the motor control unit.

Figure 7:
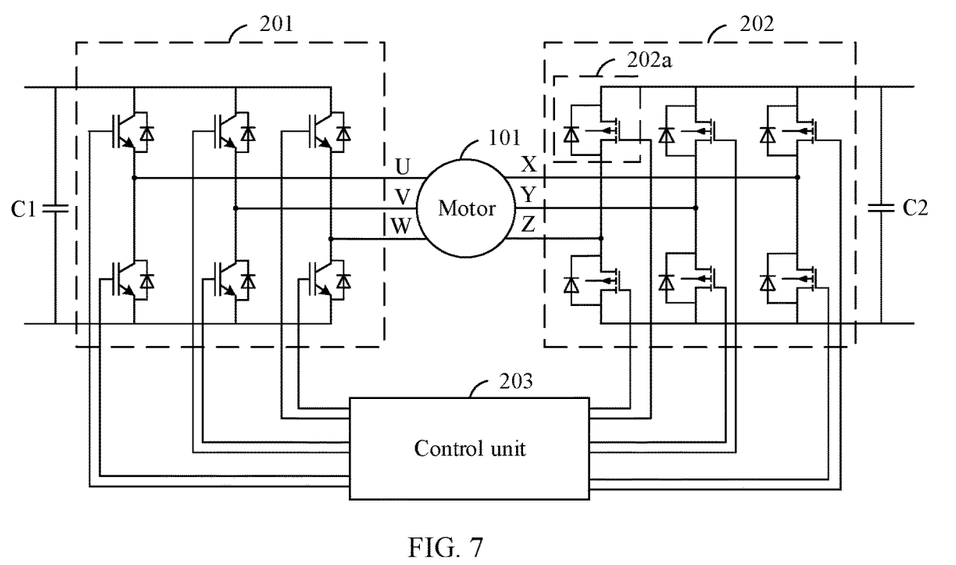
FIG. 7 is a schematic diagram of yet another motor control unit according to an embodiment of this application.

FIG. 7 is a schematic diagram of yet another motor control unit according to an embodiment of this application.

A difference from the motor control unit shown in FIG. 3 lies in that, the motor control unit provided in this embodiment may, for example, include the following two capacitors: a first filter capacitor C1 and a second filter capacitor C2, that is, each drive circuit corresponds to one filter capacitor.

As shown in the figure, two ends of the first filter capacitor C1 are connected to an input end of the first drive circuit 201. Two ends of the second filter capacitor C2 are connected to an input end of the second drive circuit 202.

When the first drive circuit 201 and the second drive circuit 202 correspond to different direct current power supplies, the first filter capacitor C1 and the second filter capacitor C2 also correspond to different direct current power supplies, and currents flowing through the two drive circuits are different in a heavy load situation. Therefore, capacitance of a corresponding filter capacitor may be determined flexibly based on an output capability of a corresponding direct current power supply, so that a current ripple on the filter capacitor can be further reduced.

In another implementation of this embodiment of this application, when the windings of the motor include six phases of windings, the first drive circuit is an IGBT three-phase half-bridge drive circuit, configured to drive three phases of windings of the motor, and the second drive circuit is a GaN three-phase half-bridge drive circuit, configured to drive the other three phases of windings of the motor. Working principles of the GaN component and the SiC-MOSFET component are similar. In this case, the control unit of the motor control unit may control working states of the two drive circuits by using a control method similar to that described above. Details are not described herein again in this embodiment.

Embodiment 3 of the Driver

The foregoing embodiment is described by using an example in which the windings of the motor include six phases of windings, and the first drive circuit and the second drive circuit each drive three phases of windings. In an actual application, the motor may increase a quantity of phases of windings based on a load requirement. For example, a motor having nine, twelve, or fifteen phases of windings may be used. In this case, a plurality of first drive circuits or a plurality of second drive circuits may be included, or a third drive circuit whose power component is different from those used in the first drive circuit and the second drive circuit may be included.

It should be noted that the quantity of phases of windings of the motor is a multiple of 3. The following uses an example in which the windings of the motor include nine phases of windings for description. When the quantity of phases of winding of the motor is extended to more phases, a principle is similar thereto, and details are not described in this embodiment.

Figure 8:
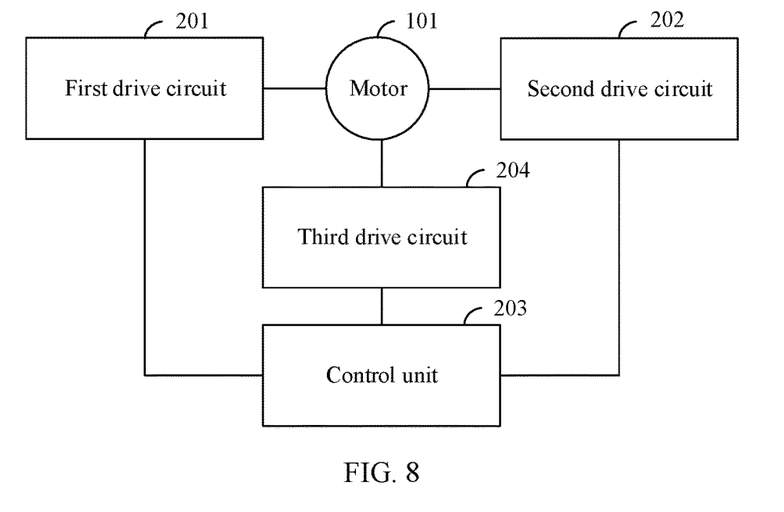
FIG. 8 is a schematic diagram of still yet another motor control unit according to an embodiment of this application.

FIG. 8 is a schematic diagram of still yet another motor control unit according to an embodiment of this application.

A difference from the motor control unit in FIG. 2 lies in that, the motor control unit further includes a third drive circuit 204.

There is one first drive circuit 201, one second drive circuit 202, and one third drive circuit 204. A type of a power component in the first drive circuit 201, a type of a power component in the second drive circuit 202, and a type of a power component in the third drive circuit 204 are different from each other, and the first drive circuit 201, the second drive circuit 202, and the third drive circuit each are configured to drive three phases of different windings in the motor.

For example, the power component in the first drive circuit 201 is an IGBT component, the power component in the second drive circuit 202 is a SiC-MOSFET component, and the power component in the third drive circuit 204 is a GaN component.

Figure 9:
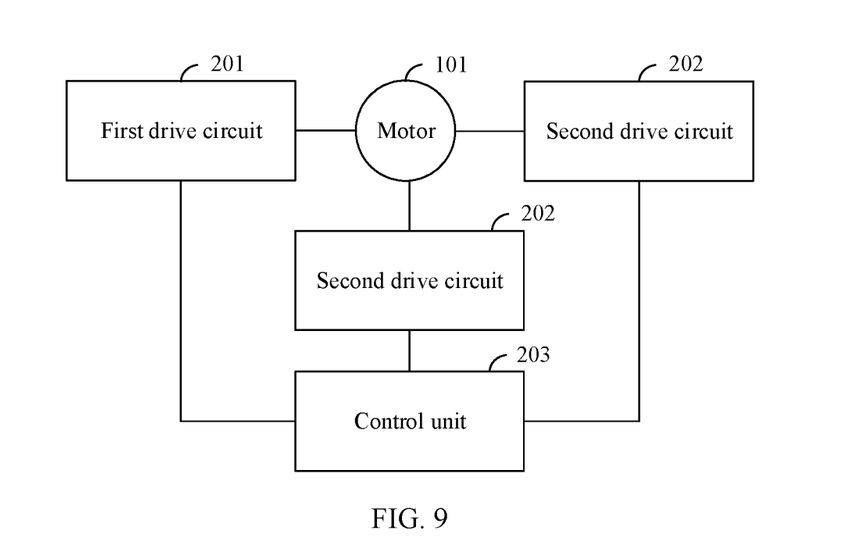
FIG. 9 is a schematic diagram of still yet another motor control unit according to an embodiment of this application.

FIG. 9 is a schematic diagram of still yet another motor control unit according to an embodiment of this application.

A difference from the motor control unit in FIG. 2 lies in that, the motor control unit includes two second drive circuits 202.

The two second drive circuits 202 are configured to drive six phases of windings of the motor 101, and the one first drive circuit 201 drives remaining three phases of windings of the motor 101.

For example, both power components in the two first drive circuits 201 are IGBT components, and a power component in the second drive circuit 202 may be a SiC-MOSFET component or a GaN component.

Figure 10:
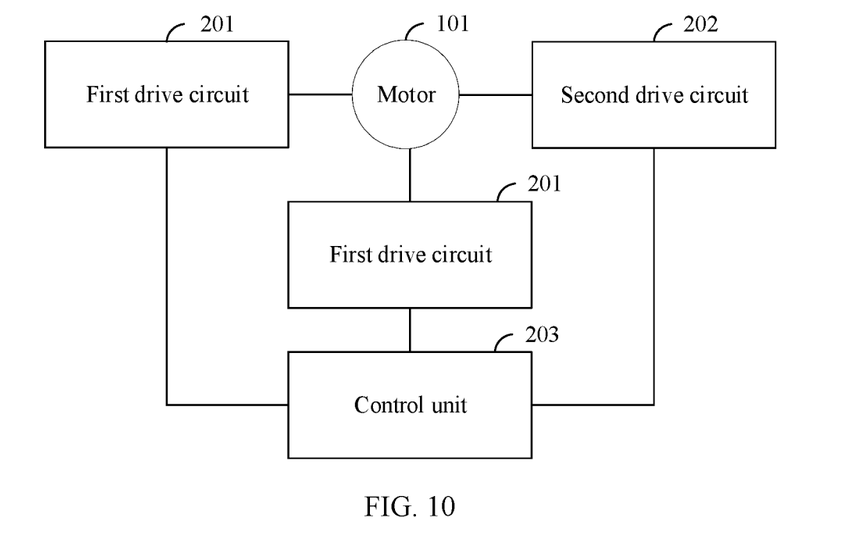
FIG. 10 is a schematic diagram of still yet another motor control unit according to an embodiment of this application.

FIG. 10 is a schematic diagram of still yet another motor control unit according to an embodiment of this application.

A difference from the motor control unit in FIG. 2 lies in that, the motor control unit includes two first drive circuits 201.

The two first drive circuits 201 are configured to drive six phases of windings of the motor 101, and the one second drive circuit 202 drives remaining three phases of windings of the motor 101.

For example, a power component in the first drive circuit 201 is an IGBT component, and both power components in the two second drive circuits 202 may be SiC-MOSFET components or GaN components.

In an actual application, implementations of the foregoing motor control units and motors may be determined by comprehensively considering an exemplary type of an electric vehicle (a car, a bus, a truck, or the like), a motor load status (light load or heavy load), and component costs. This is not specifically limited in the embodiments of this application. For example, when the type of the electric vehicle is a bus or a truck, and a motor load state is usually heavy load, if the windings of the motor include six phases of windings, the motor control unit shown in FIG. 10 may be used, that is, an adequate current is supplied to the motor by using the two first drive circuits 201.

A quantity of phases of the motor and a quantity of drive circuits are increased, so that the motor and the motor control unit not only have a fault tolerance capability, but also can adapt to different load situations. In addition, when the quantity of phases of the motor is determined, an optimal (or better) balance between motor efficiency, motor stability, and component costs can be achieved by adjusting a type of a power component used in each drive circuit.

System Embodiment

Based on the motor control unit provided in the foregoing embodiment, this embodiment of this application further provides a power system including the motor control unit provided in the foregoing embodiment, which may be applied to an electric vehicle. Details are described below with reference to an accompanying drawing.

Figure 11:
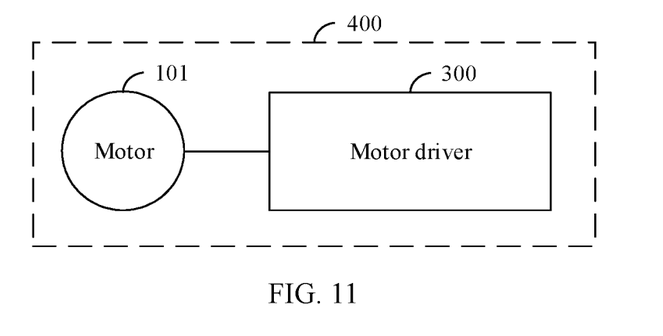
FIG. 11 is a schematic diagram of a power system according to an embodiment of this application.

FIG. 11 is a schematic diagram of a power system according to an embodiment of this application.

The power system 400 includes a motor 101 and a motor control unit 300.

The motor control unit 300 includes, for example, a control unit and at least two drive circuits: a first drive circuit and a second drive circuit.

The motor 101 is configured to supply power to a load. A quantity of windings of the motor 101 is at least N times 3. N is an integer greater than or equal to 2. For example, the windings of the motor 101 may be any of the following: six phases of windings, nine phases of windings, twelve phases of windings, fifteen phases of windings, and more windings.

The motor control unit is configured to drive the windings of the motor 101. For a description of the motor control unit, refer to any one of the foregoing implementations. Details are not described herein again in this embodiment of this application.

The power system provided in this application includes the motor control unit described above, and the motor control unit includes at least two different drive circuits: a first drive circuit and a second drive circuit. A type of a power component in the first drive circuit is different from a type of a power component in the second drive circuit, a loss of the power component in the first drive circuit is greater than a loss of the power component in the second drive circuit, and a current withstand capability of the power component in the first drive circuit is greater than a current withstand capability of the power component in the second drive circuit. When determining that the load of the motor is less than a preset load (that is, light load), the control unit of the motor control unit controls the first drive circuit to stop working and controls the second drive circuit to work. Because a conduction loss of the second drive circuit is lower, in a light load situation, only the second drive circuit is allowed to work, which can reduce a loss generated by the driver, thereby improving efficiency of the driver. When determining that the load of the motor is greater than or equal to the preset load (that is, heavy load), the control unit controls both the first drive circuit and the second drive circuit to work, so that the higher current withstand capability of the first drive circuit and the lower loss of the second drive circuit can be utilized. Respective advantages of the first drive circuit and the second drive circuit are combined, so that working efficiency can be improved while safety can be ensured in a large current situation.

In conclusion, when the power system provided in this application is applied to an electric vehicle, efficiency of the motor control unit can be improved, thereby improving endurance of an in-vehicle battery (power battery pack) of the electric vehicle. In addition, because the power system includes at least two drive circuits, when one of the drive circuits is faulty, another drive circuit can continue to work normally, thereby enhancing a fault tolerance capability of the power system.

It should be understood that, in this application, "at least one" means one or more, and "a plurality of" means two or more. The term "and/or" is used to describe an association relationship between associated objects, and indicates that three relationships may exist. For example, "A and/or B" may indicate the following three cases: only A exists, only B exists, and both A and B exist, where A and B may be singular or plural. The character "/" generally indicates an "or" relationship between the associated objects. "At least one of the following" or similar expressions indicate any combination of the following, including one or any combination of the following. For example, at least one of a, b, or c may indicate: a, b, c, "a and b", "a and c", "b and c", or "a, b, and c", where a, b, and c may be singular or plural.

The foregoing descriptions are merely example embodiments of this application, and are not intended to limit this application in any form. Although the example embodiments of this application are disclosed above, the embodiments are not intended to limit this application. By using the method and the technical content disclosed above, a person of ordinary skill in the art can make a plurality of possible changes and modifications to the technical solutions of this application, or amend the technical solutions thereof to be embodiments with equal effects through equivalent variations without departing from the scope of the technical solutions of this application. Therefore, any simple amendments, equivalent variations, and modifications made to the foregoing embodiments according to the technical essence of this application without departing from the content of the technical solutions of this application shall fall within the protection scope of the technical solutions of this application.

What is claimed is:

1. A device for controlling a motor, comprising:
   a controller; and
   at least two drive circuits: a first drive circuit and a second drive circuit,
   wherein a type of a power component in the first drive circuit is different from a type of a power component in the second drive circuit, a loss of the power component in the first drive circuit is greater than a loss of the power component in the second drive circuit, and a current withstand capability of the power component in the first drive circuit is greater than a current withstand capability of the power component in the second drive circuit,
   wherein the first drive circuit is configured to invert a first direct current output by a corresponding first direct current power supply into a first alternating current, and supply the first alternating current to a first part of windings of the motor,
   wherein the second drive circuit is configured to invert a second direct current output by a corresponding second direct current power supply into a second alternating current, and supply the second alternating current to a second part of the windings of the motor, and
   wherein the controller is configured to:
   in response to determining that a load of the motor is less than a preset load, control the first drive circuit to stop working and control the second drive circuit to start to work; or
   in response to determining that the load of the motor is greater than or equal to the preset load, control both the first drive circuit and the second drive circuit to start to work.

2. The device according to claim 1, wherein the power component of the first drive circuit is an insulated gate bipolar transistor (IGBT), and the power component of the second drive circuit is a wide-band-gap semiconductor component.

3. The device according to claim 2, wherein the wide-band-gap semiconductor component is one of the followings:
   a silicon carbide metal-oxide-semiconductor field-effect transistor (SiC-MOSFET) and a gallium nitride (GaN) transistor.

4. The device according to claim 3, wherein the motor comprises six phases of windings, the first drive circuit is an IGBT three-phase half-bridge drive circuit, and the second drive circuit is a SiC-MOSFET three-phase half-bridge drive circuit, and
wherein the IGBT three-phase half-bridge drive circuit is configured to drive three phases of the windings in the motor, and the SiC-MOSFET three-phase half-bridge drive circuit is configured to drive the other three phases of the windings in the motor.

5. The device according to claim 3, wherein the motor comprises six phases of windings, the first drive circuit is an IGBT three-phase half-bridge drive circuit, and the second drive circuit is a GaN three-phase half-bridge drive circuit, and
wherein the IGBT three-phase half-bridge drive circuit is configured to drive three phases of the windings in the motor, and the GaN three-phase half-bridge drive circuit is configured to drive the other three phases of the windings in the motor.

6. The device according to claim 1, wherein
the controller is further configured to send a first group of drive signals to the power component of the first drive circuit, and send a second group of drive signals to the power component of the second drive circuit, wherein
an angle range of a phase difference between the first group of drive signals and the second group of drive signals is 0 to 180 degrees.

7. The device according to claim 6, wherein the phase difference between the first group of drive signals and the second group of drive signals is 90 degrees.

8. The device according to claim 1, wherein the motor comprises nine phases of windings, and there are two first drive circuits and one second drive circuit, and
wherein the two first drive circuits are configured to drive six phases of the windings in the motor, and the one second drive circuit is configured to drive the remaining three phases of the windings in the motor.

9. The device according to claim 1, further comprising at least one third drive circuit, wherein
the type of the power component in the first drive circuit, the type of the power component in the second drive circuit, and a type of a power component in the third drive circuit are different from each other.

10. The device according to claim 9, wherein the motor comprises nine phases of windings, and there are one first drive circuit, one second drive circuit, and one third drive circuit, and
wherein the first drive circuit, the second drive circuit, and the third drive circuit each is configured to drive three phases of different windings in the motor.

11. The device according to claim 1, further comprising a filter capacitor, wherein
two ends of the filter capacitor are connected between an input end of the first drive circuit and an input end of the second drive circuit.

12. The device according to claim 1, further comprising a first filter capacitor and a second filter capacitor, wherein
two ends of the first filter capacitor are connected to an input end of the first drive circuit;
two ends of the second filter capacitor are connected to an input end of the second drive circuit; and
the first filter capacitor and the second filter capacitor correspond to different direct current power supplies.

13. The device according to claim 1, wherein each of the first and second direct current power supplies is a power battery pack of an electric vehicle, and a vehicle controller of the electric vehicle sends the load of the motor to the device.

14. A power system, comprising a motor and a device for controlling the motor, wherein the device comprises a controller and at least two drive circuits: a first drive circuit and a second drive circuit, wherein
a type of a power component in the first drive circuit is different from a type of a power component in the second drive circuit, a loss of the power component in the first drive circuit is greater than a loss of the power component in the second drive circuit, and a current withstand capability of the power component in the first drive circuit is greater than a current withstand capability of the power component in the second drive circuit,
wherein the first drive circuit is configured to invert a first direct current output by a corresponding first direct current power supply into a first alternating current, and supply the first alternating current to a first part of windings of a motor,
wherein the second drive circuit is configured to invert a second direct current output by a corresponding second direct current power supply into a second alternating current, and supply the second alternating current to a second part of the windings of the motor; and,
wherein the controller is configured to
in response to determining that a load of the motor is less than a preset load, control the first drive circuit to stop working and control the second drive circuit to start to work; or
in response to determining that the load of the motor is greater than or equal to the preset load, control both the first drive circuit and the second drive circuit to start to work,
wherein the device is configured to drive the windings of the motor, and
wherein the motor is configured to supply a power to the load, wherein a quantity of the windings of the motor is at least N times 3, and N is an integer greater than or equal to 2.

15. The system according to claim 14, wherein the power component of the first drive circuit is an insulated gate bipolar transistor (IGBT), and the power component of the second drive circuit is a wide-band-gap semiconductor component.

16. The system according to claim 15, wherein the wide-band-gap semiconductor component is one of the followings:
a silicon carbide metal-oxide-semiconductor field-effect transistor (SiC-MOSFET) and a gallium nitride (GaN) transistor.

17. The system according to claim 16, wherein the motor comprises six phases of windings, the first drive circuit is an IGBT three-phase half-bridge drive circuit, and the second drive circuit is a SiC-MOSFET three-phase half-bridge drive circuit, and
wherein the IGBT three-phase half-bridge drive circuit is configured to drive three phases of the windings in the motor, and the SiC-MOSFET three-phase half-bridge drive circuit is configured to drive the other three phases of the windings in the motor.

18. The system according to claim 16, wherein the motor comprises six phases of windings, the first drive circuit is an IGBT three-phase half-bridge drive circuit, and the second drive circuit is a GaN three-phase half-bridge drive circuit, and wherein the IGBT three-phase half-bridge drive circuit is configured to drive three phases of the windings in the motor, and the GaN three-phase half-bridge drive circuit is configured to drive the other three phases of the windings in the motor.

19. The system according to claim 14, wherein the windings of the motor are at least one of the followings: six phases of windings, nine phases of windings, twelve phases of windings, or fifteen phases of windings.

20. The system according to claim 14, wherein each of the first and second direct current power supplies is a power battery pack of an electric vehicle, and a vehicle controller of the electric vehicle sends the load of the motor to the device.

* * * * *

UNITED STATES PATENT AND TRADEMARK OFFICE
CERTIFICATE OF CORRECTION

PATENT NO. : 11,984,831 B2
APPLICATION NO. : 17/752512
DATED : May 14, 2024
INVENTOR(S) : Ningbo Feng et al.

Page 1 of 1

It is certified that error appears in the above-identified patent and that said Letters Patent is hereby corrected as shown below:

In the Claims

Claim 14, Column 16, Line 26: reads as "motor; and," should read as --motor,--
Claim 14, Column 16, Line 27: reads as "to" should read as --to:--

Signed and Sealed this
Fifteenth Day of April, 2025

Coke Morgan Stewart
*Acting Director of the United States Patent and Trademark Office*